(12) United States Patent
Iwasaki-Higbee

(10) Patent No.: US 6,416,692 B1
(45) Date of Patent: Jul. 9, 2002

(54) SEWER SYSTEM PIPE REPAIRS

(76) Inventor: Jeffrey L. Iwasaki-Higbee, 1983 Alaelao St., Honolulu, HI (US) 96821

( * ) Notice: Subject to any disclaimer, the term of this patent is extended or adjusted under 35 U.S.C. 154(b) by 0 days.

(21) Appl. No.: 09/523,036

(22) Filed: Mar. 10, 2000

(51) Int. Cl.[7] .................. F16L 55/1645; F16L 55/164; F16L 55/163
(52) U.S. Cl. ............... 264/36.17; 264/36.2; 264/36.22; 264/40.3; 264/40.5; 264/40.6; 264/269; 264/516; 156/94; 138/97
(58) Field of Search ................. 264/33, 34, 35, 264/36.16, 36.17, 36.2, 36.22, 40.5, 40.6, 269, 516, 40.3; 156/94; 138/97

(56) References Cited

U.S. PATENT DOCUMENTS

| | | | |
|---|---|---|---|
| 1,736,293 A | | 11/1929 | Van Denburg |
| 3,710,812 A | * | 1/1973 | Wise .......................... 137/15 |
| 4,244,895 A | | 1/1981 | Nakashin ..................... 264/36 |
| 4,245,970 A | * | 1/1981 | St. Onge ..................... 425/13 |
| 4,421,698 A | * | 12/1983 | Vanderlans ................ 264/40.1 |
| 4,529,008 A | * | 7/1985 | Appleton ..................... 138/97 |
| 4,602,974 A | * | 7/1986 | Wood et al. ................ 156/287 |
| 5,194,193 A | | 3/1993 | Humphreys .................. 264/35 |
| 5,346,658 A | * | 9/1994 | Gargiulo .................... 264/40.3 |
| 5,384,086 A | * | 1/1995 | Smith ........................ 264/516 |
| 5,469,891 A | * | 11/1995 | Lund et al. ................... 138/98 |
| 5,501,248 A | * | 3/1996 | Kiest, Jr. ..................... 138/98 |
| 5,549,856 A | * | 8/1996 | Yokoshima .................. 264/36 |
| 5,632,952 A | | 5/1997 | Mandich ..................... 264/516 |
| 5,765,597 A | * | 6/1998 | Kiest, Jr. et al. ............. 138/78 |
| 5,906,789 A | * | 5/1999 | Kamiyama et al. ......... 264/516 |
| 5,983,948 A | * | 11/1999 | Yagi et al. .................... 138/98 |

FOREIGN PATENT DOCUMENTS

| | | | | |
|---|---|---|---|---|
| GB | 2249602 | * | 5/1992 | .......... F16L/55/162 |

OTHER PUBLICATIONS

Neil J. Stephens, An Australian Conduit Grouting System, 1992, entire document, but particularly pp. 1–4 and 7–8.
Sewliner Pty.Limited. Fulline 3000, at least as early as 1999.

* cited by examiner

Primary Examiner—Jan H. Silbaugh
Assistant Examiner—Michael I. Poe
(74) Attorney, Agent, or Firm—Chernoff, Vilhauer, McClung & Stenzel, LLP

(57) ABSTRACT

A method of repairing leaking underground pipes, particularly gravity-flow sewer pipes, without excavation, by using a flexible liner tube containing a fluid under sufficient pressure to exclude groundwater, while forcing a fluid sealant material into leaking defects in a pipe wall, and through openings in the pipe wall into voids outside the pipe. The flexible liner tube is everted into the pipe to keep the sealant material in place and also to continue to exclude groundwater for a period of time long enough for the sealant material to cure in place to effect sealing repair of the defects in the pipe wall and also at least partially fill voids outside the pipe. Fluid is kept under great enough pressure in the liner tube to exclude groundwater and may be heated or chilled to assist in preparing the pipe for sealant or to cure the sealant material.

43 Claims, 11 Drawing Sheets

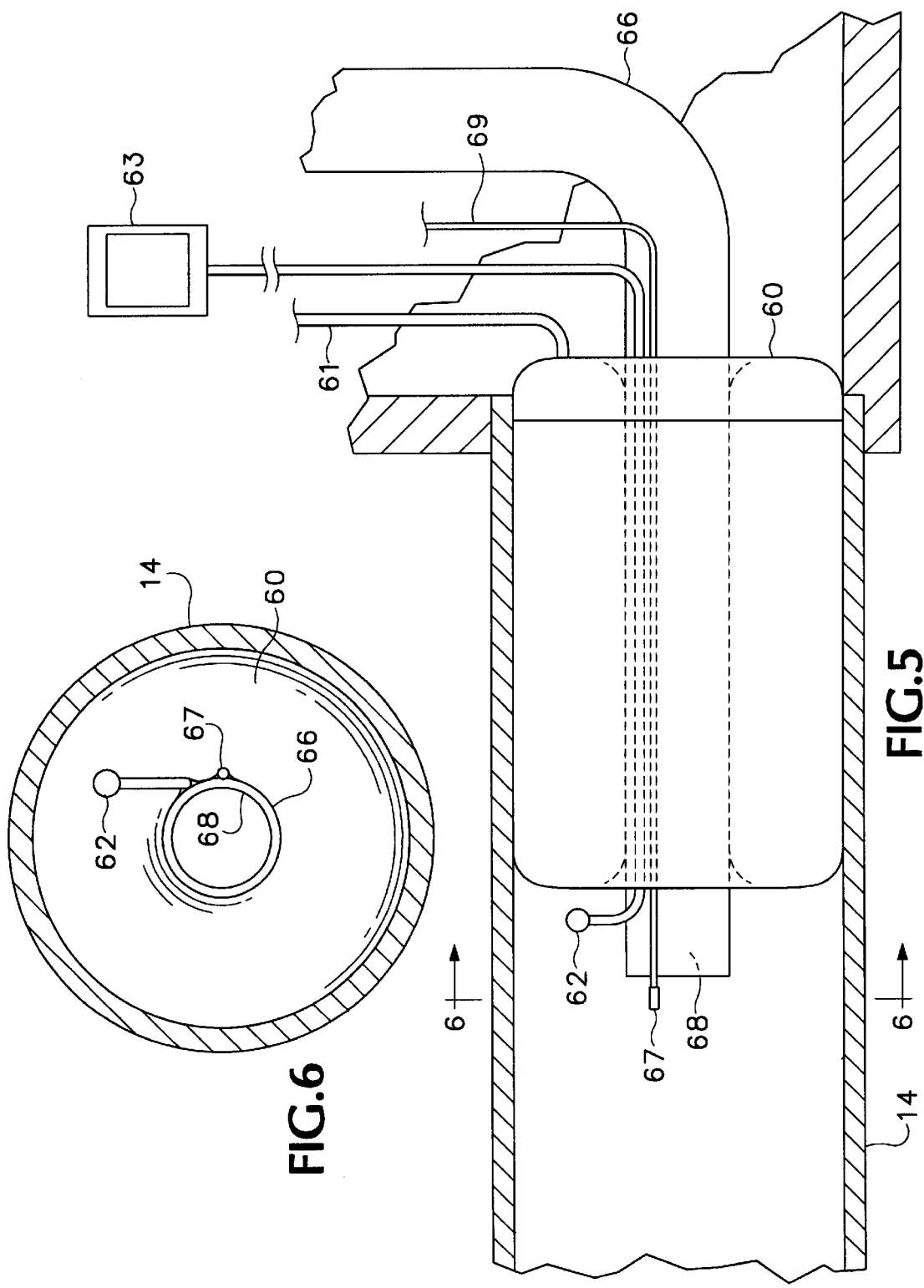

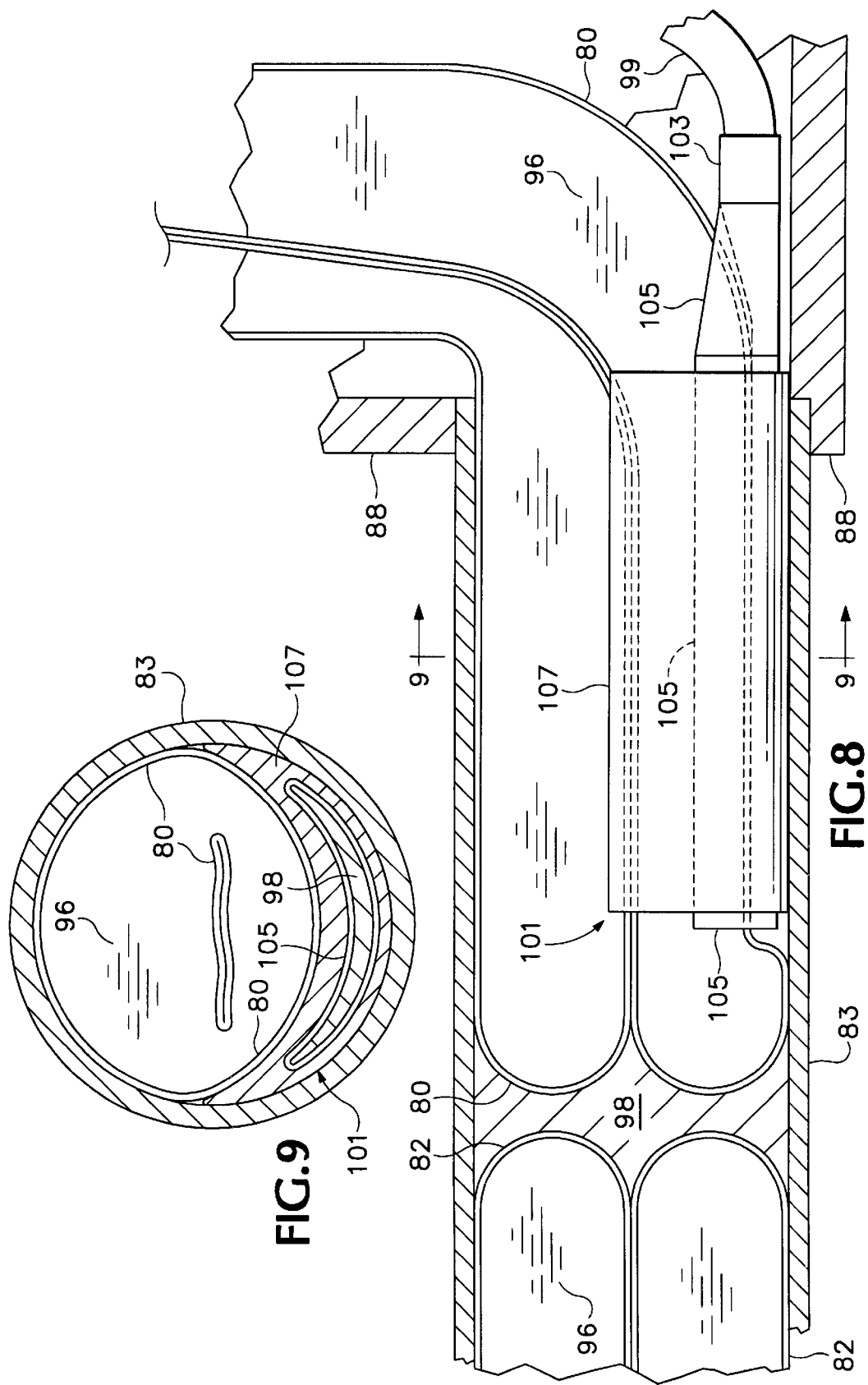

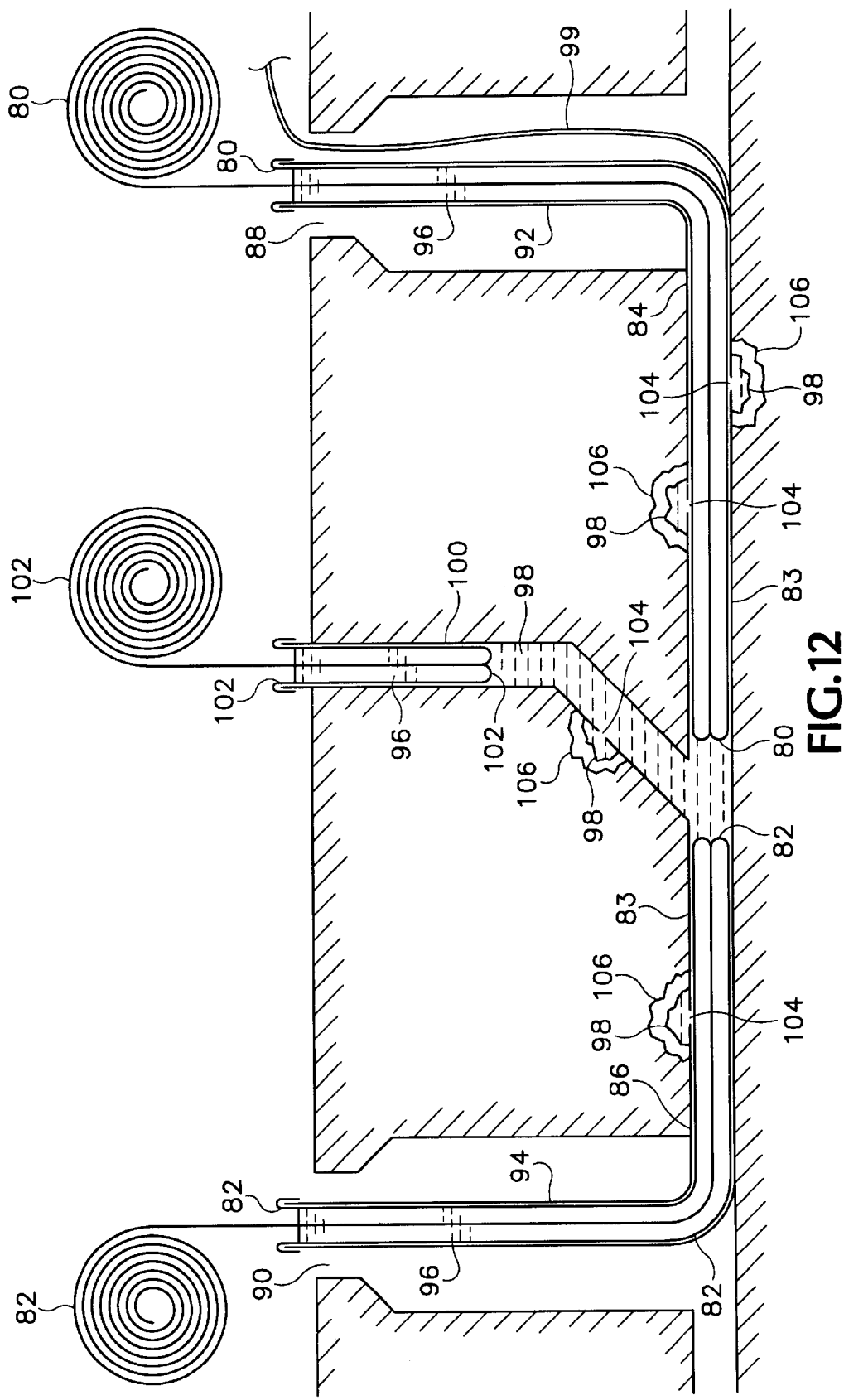

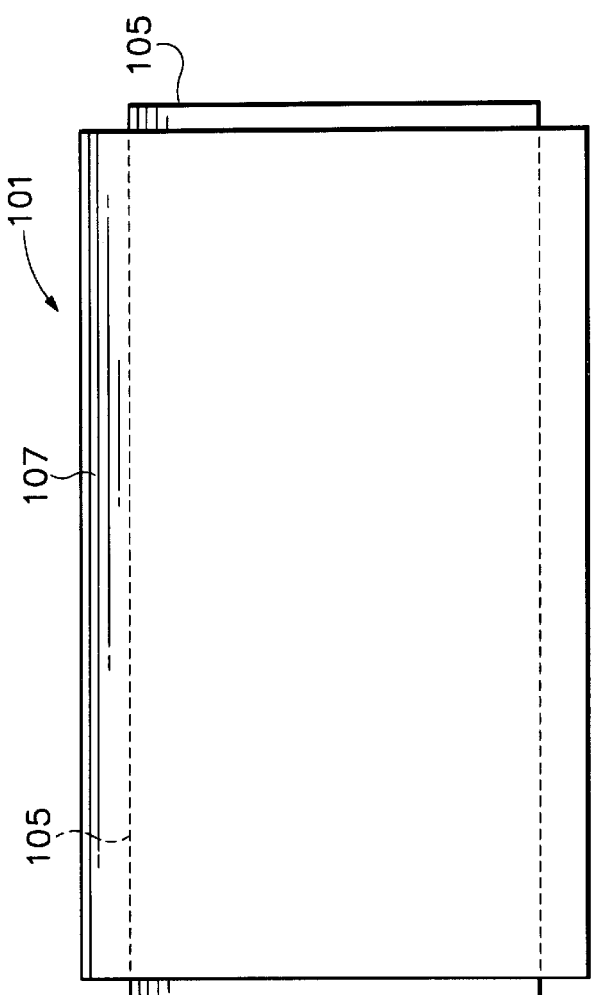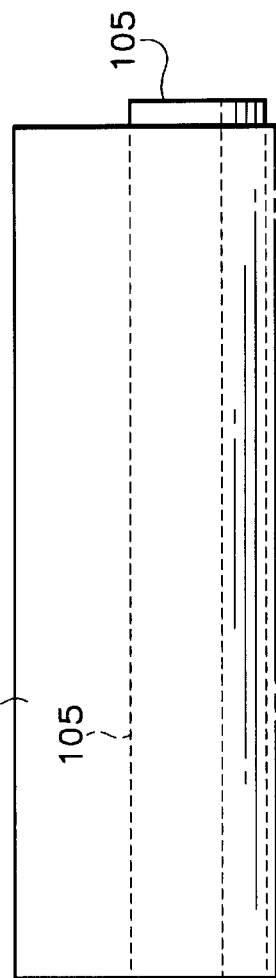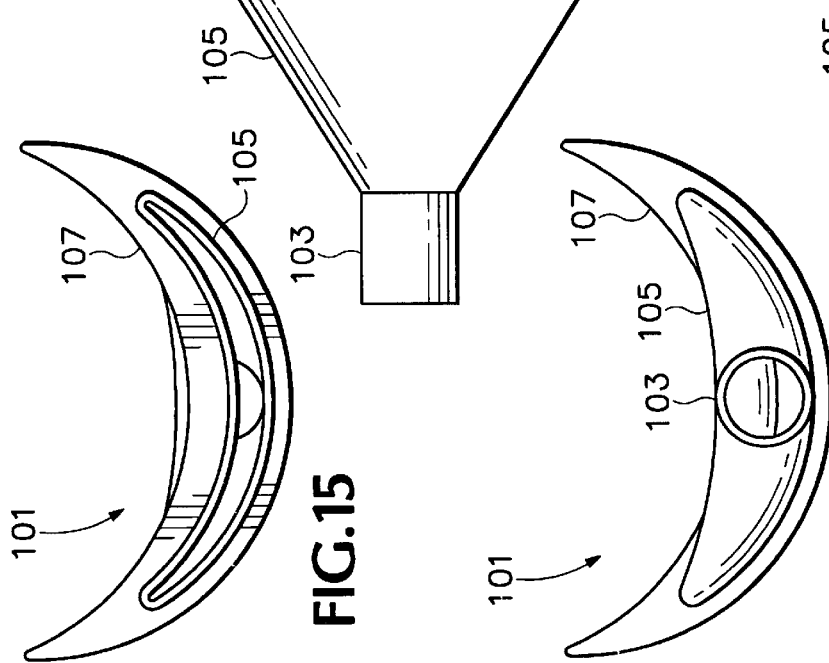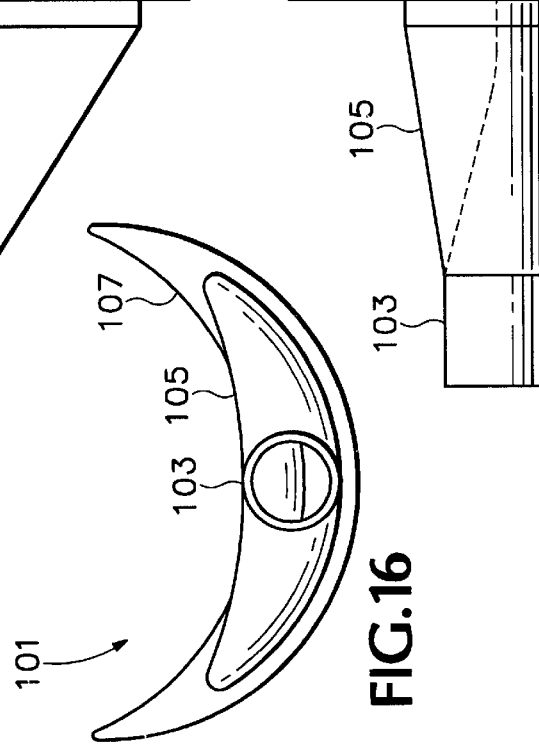

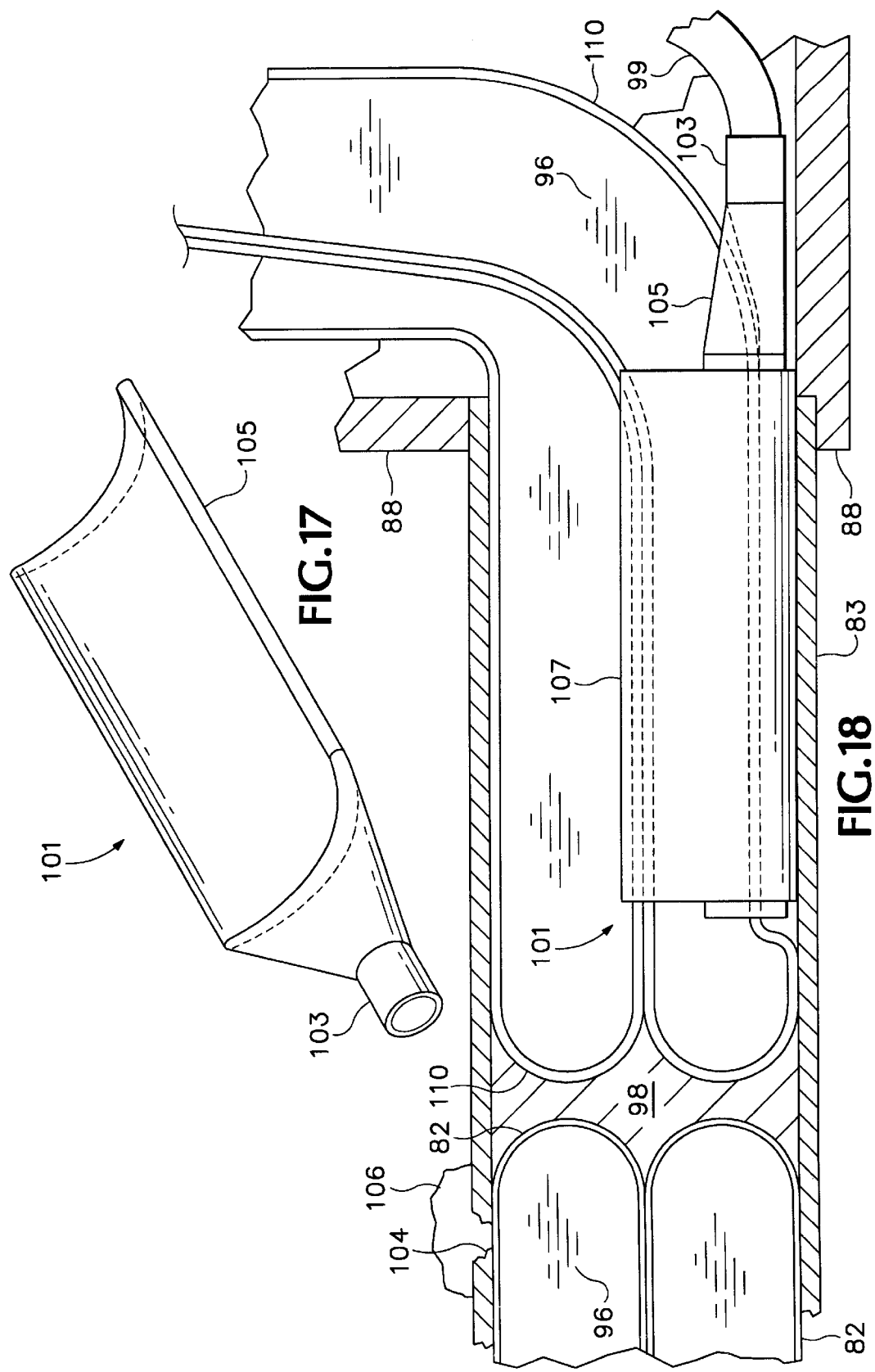

SEWER SYSTEM PIPE REPAIRS

BACKGROUND OF THE INVENTION

The present invention relates generally to the in situ repair of underground pipe systems, and more particularly to a method of repairing holes, cracks, and defective joints in underground drainage pipe systems such as municipal and industrial sewer systems.

Underground sanitary sewer pipe systems are designed to convey raw sewage and waste water by gravity flow to waste water treatment facilities where the sewage is processed and the waste water is treated for return to the environment. Ideally a sewer system will convey sewage and waste water to a treatment facility without leakage or spillage, but many urban sanitary sewage systems are in a state of significant disrepair. As a result of defects in sewer pipe networks, ground water surrounding sewer pipes can infiltrate into the sewer drainage systems, adding to the quantity of water which must be treated, thereby reducing the effectiveness or surpassing the capacity of waste water treatment facilities. Sewer pipes may be surrounded by ground water permanently, or on a seasonal, tidal, or rainfall related basis, any of which contributes to overload of waste water treatment facilities.

Additionally, depending on the height of the water table surrounding a sewer system, raw sewage may leak out of the sewer pipes into the surrounding soil.

Where leaking sewer pipes allow infiltration of ground water into the sewer pipes, soil particles are typically suspended in the ground water and flow into the sewer pipe, leaving voids in the soil where such suspended soil particles originated. When voids are left on the outside of the pipe, the sewer pipe no longer is supported by surrounding soil and may sag or move, increasing the size of cracks in a pipe wall or gaps between adjacent pieces of pipe. Enlarged openings through the wall of a pipe naturally permit additional infiltration of surrounding ground water, enlarging voids, until pipes eventually can collapse completely as a result of loss of support from surrounding soil.

Sewer pipes thus eventually may include longitudinal cracks, larger holes where portions of a pipe wall have collapsed, defective joints between adjacent lengths of pipe, where lengths of pipe have shifted apart or where sealing material has been carried away from a joint, and gaps or defective seals where an interconnection of a smaller pipe with a larger pipe has been disturbed.

Uncovering sewer pipes or the like to repair defects and replace defective piping is expensive, inconvenient, and dangerous, particularly where sewers are situated beneath busy streets. Nevertheless, repair must be effected or large enough voids may be created to allow the formation of potholes or sinkholes, or total collapse of streets located above such sewer pipes.

Previous attempts to deal with this problem have been disclosed, for example, in Humphreys, et al., U.S. Pat. No. 5,194,193, Nakashin U.S. Pat. No. 4,244,895, and VanDenBerg U.S. Pat. No. 1,736,293, all of which recognize and attempt to deal with the need to force sealing material through defects in a sewer pipe into an adjacent void in order to provide satisfactory repair of the sewer pipes. The sealant materials suggested by VanDenBerg and Nakashin for repairing such sewer pipes result in the need to dispose of significant quantities of sealant material which must not be left inside a sewer pipe but is not actually used to seal holes in a sewer pipe wall and is not reusable.

The method taught by Humphreys, et al., deals with excess sealant, but faces numerous problems in practice, since it teaches use of wax as a sealant, but in the presence of water, such as ground water surrounding a leaking pipe or infiltrating into a pipe through a crack or hole or similar defect, wax does not provide a tight seal. Instead, it shrinks and tends to create a porous accretion in soil by covering individual soil particles, rather than forming a solid plug or barrier and adhering to an outer surface of a pipe when the molten wax cools and becomes solid.

According to one other previously-known method for sealing underground pipes, a quantity of a catalyzed polyurethane-based grout is placed into a sewer conduit between a movable plug and a bag which is everted (or inverted, as it is often referred to in the industry) within the conduit. The grout is subjected to pressure between the bag being everted and the plug. The grout is thus forced outward through defects in the wall of the conduit and into the surrounding soil to form a seal. As the bag is everted further to cover each defect in the conduit it keeps the grout from returning through the defect into the interior. Thixotropic agents are included in the grout mix to prevent uncured material from flowing away from where it is needed to the surrounding soil or downward along the outer surface of the conduit. This method of sealing a pipe, however, does not address containment of the grout at intersections between different branches of a conduit or where the movable plug is located in a defective portion of the conduit, nor does it provide for keeping water out of the conduit or provide for recovery or disposal of grout which does not move from the interior of the conduit into defects in the wall of the conduit. Likewise, it does not provide for traversing a defect such as a severely offset joint or shear. Since the plug can only be pulled, it cannot advance once it has become wedged in place in such a defect.

BRIEF SUMMARY OF THE INVENTION

The present invention provides a method for effectively sealing leaks in underground pipes such as sewer system piping, and which overcomes the aforementioned shortcomings and disadvantages of the previously known methods for repairing such sewer system piping. The method of the invention in a most basic preferred embodiment includes the steps of isolating a section of a system of drainage piping from active use; thereafter blocking existing defects against further intrusion of ground water by pressurizing and everting a flexible liner and containment tube within the section of piping to be repaired, utilizing pressure greater than the pressure of ground water attempting to intrude through defects in the piping; continuing to maintain pressure within the interior of the piping to be repaired while installing a fluid sealant material within the piping and forcing effective quantities of the sealant material into and outwardly through defects existing in the pipe walls by filling a portion of the pipe with such fluid sealant material under adequate pressure; thereafter, while still maintaining pressure greater than the pressure of ground water attempting to intrude through defects in the pipe, again everting the liner and containment tube into the portion of the pipe to be repaired and keeping the liner and containment tube in place, holding the sealant material in position while it cures in place to plug openings through the wall of the piping and to form a barrier on an exterior surface of the piping where sealant material has been forced outwardly through effective portions of the piping.

In accordance with one aspect of the present invention a fluid (such as water or air) used to fill the liner and containment tube may be used to carry heat to or away from the material of the piping being repaired in order to provide an environment having a required temperature to facilitate use of a particular sealant material to plug and seal defective portions of the piping.

According to one aspect of the present invention the flexible liner and containment tube can be used to sustain pressure on the fluid sealant in order to force it into leaking openings in a wall of a pipe to be repaired and thereafter to hold the sealant material in place while it cures.

In accordance with a method that is one embodiment of the present invention a quantity of fluid sealant is moved to different locations, along a length of a section of piping being repaired, by the use of coordinated extension and retraction of a plurality of everted liner and containment tubes within an underground piping system being repaired.

In accordance with a novel method that is a further embodiment of the present invention pressure is maintained within everted liner and containment tubes within interconnected portions of an underground piping system so as to maintain sufficient pressure on a quantity of fluid sealant within one or more portions of such a piping system and thus to force effective quantities of such fluid sealant into voids adjacent to defects that provide openings through the walls of underground pipes being repaired.

In accordance with another aspect of the present invention, everted liner and containment tubes are used to move excess quantities of fluid sealant material to locations, within a portion of a piping system being repaired, where such excess sealant material can be removed from the pipe while such everted liner and containment tubes are maintained under sufficient pressure to hold fluid sealant material in a required location to seal defects in the portion of a piping system being repaired as the sealant material cures.

In accordance with one embodiment of the present invention a fluid sealant material has a density at least about equal to the specific gravity of water so that water in the piping being repaired does not displace the sealant material.

In accordance with another embodiment of the present invention, a mixture of fluid sealant material incorporates a hydrophillic material in a quantity sufficient to cause the sealant material to swell within an opening, such as a crack or similar defect in a wall of a pipe being repaired or in the porous strata surrounding the pipe, and create a tight seal within such a defect or form a barrier outside the pipe.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 5 is a somewhat schematic sectional view of a sewer main line pipe at a manhole or similar location, with an inflatable flow-through plug and sensors in place in the pipe for use in practicing the invention.

FIG. 6 is a section view through the sewer pipe shown in FIG. 5, taken in the direction of line 6—6 and showing the inflatable flow-through plug and sensors.

FIG. 8 is a sectional view of a portion of the sewer pipe system shown in FIG. 7, at an enlarged scale, showing a sealant delivery hose and nozzle in place along a liner and containment tube.

FIG. 9 is a sectional view, taken along line 9—9 of FIG. 8, showing the sewer pipe with the liner and containment tube and the sealant delivery hose and nozzle in place in the sewer main line pipe.

FIG. 12 is another view similar to FIG. 7 at yet a further subsequent step of performing repairs of the sewer pipes in accordance with the invention.

FIG. 13 is a top plan view of an end nozzle fitting for a hose, useful in delivering fluid sealant into a sewer pipe for use in its repair, and for removing excess fluid sealant material from within the sewer pipe.

FIG. 14 is a side elevational view of the end nozzle shown in FIG. 13.

FIG. 15 is an outer, or open, end view of the nozzle shown in FIG. 13.

FIG. 16 is a rear, or connector end view of the nozzle shown in FIG. 13.

FIG. 17 is a perspective view from the connector end of the inner, pipe-like core portion of the nozzle shown in FIG. 13.

FIG. 18 is a view similar to FIG. 8 showing a step in repairing a sewer pipe in accordance with another embodiment of the invention.

DETAILED DESCRIPTION OF THE PREFERRED EMBODIMENTS

Figure 1:
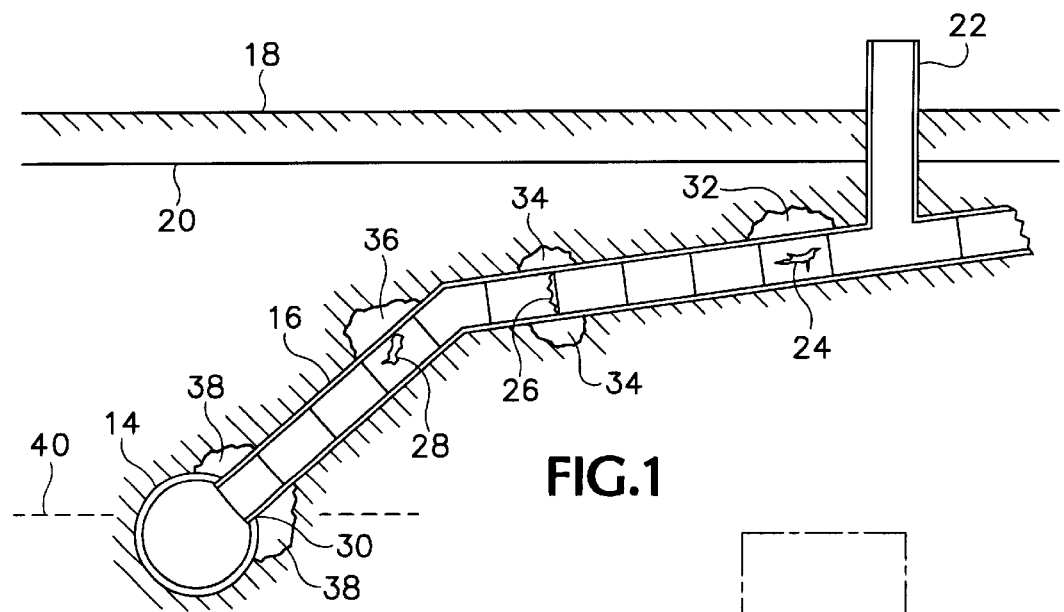
FIG. 1 is an elevational view of a typical house lateral-to-sewer main connection, showing several defects.

Referring first to FIG. 1 of the drawings which form a part of the disclosure herein, a main line sewer pipe 14 is shown in section view in a lengthwise direction at a junction where a lateral sewer pipe 16 enters at a relatively steep downward inclination into the main line 14 beneath the surface 18 of the ground, and beneath the level 20 of the water table. A riser, or clean out access pipe 22 extends vertically above the lateral sewer pipe 16 at some distance from a building (not shown) served by the lateral sewer pipe. Various types of defects are illustrated in a simplified manner. For example, a longitudinal crack is present at the location indicated by reference numeral 24. A joint between longitudinally adjacent sewer pipe sections is defective at 26, either because of improper alignment, or because caulking material or a seal has been displaced or has failed. At another location a portion of a section of the pipe has failed leaving a hole 28 through the wall of the pipe. Where the lateral pipe 16 enters into the sewer main line at 30, shearing relative movement between the lateral and the main line pipe has created an opening. At each of the defects just mentioned, infiltration of groundwater has resulted in transport of particles into the pipe from the soil originally compactly surrounding the pipe, leaving voids 32, 34, 36 and 38 in the soil, reducing the amount of support provided for the sewer pipes at the locations of the voids.

It will be understood that were the water table to fall to the level indicated in broken line at 40, it would be possible for sewage and groundwater within the sewer pipe to exfiltrate into the surrounding soil in the vicinity of the voids thus contaminating the surrounding soil.

Figure 2:
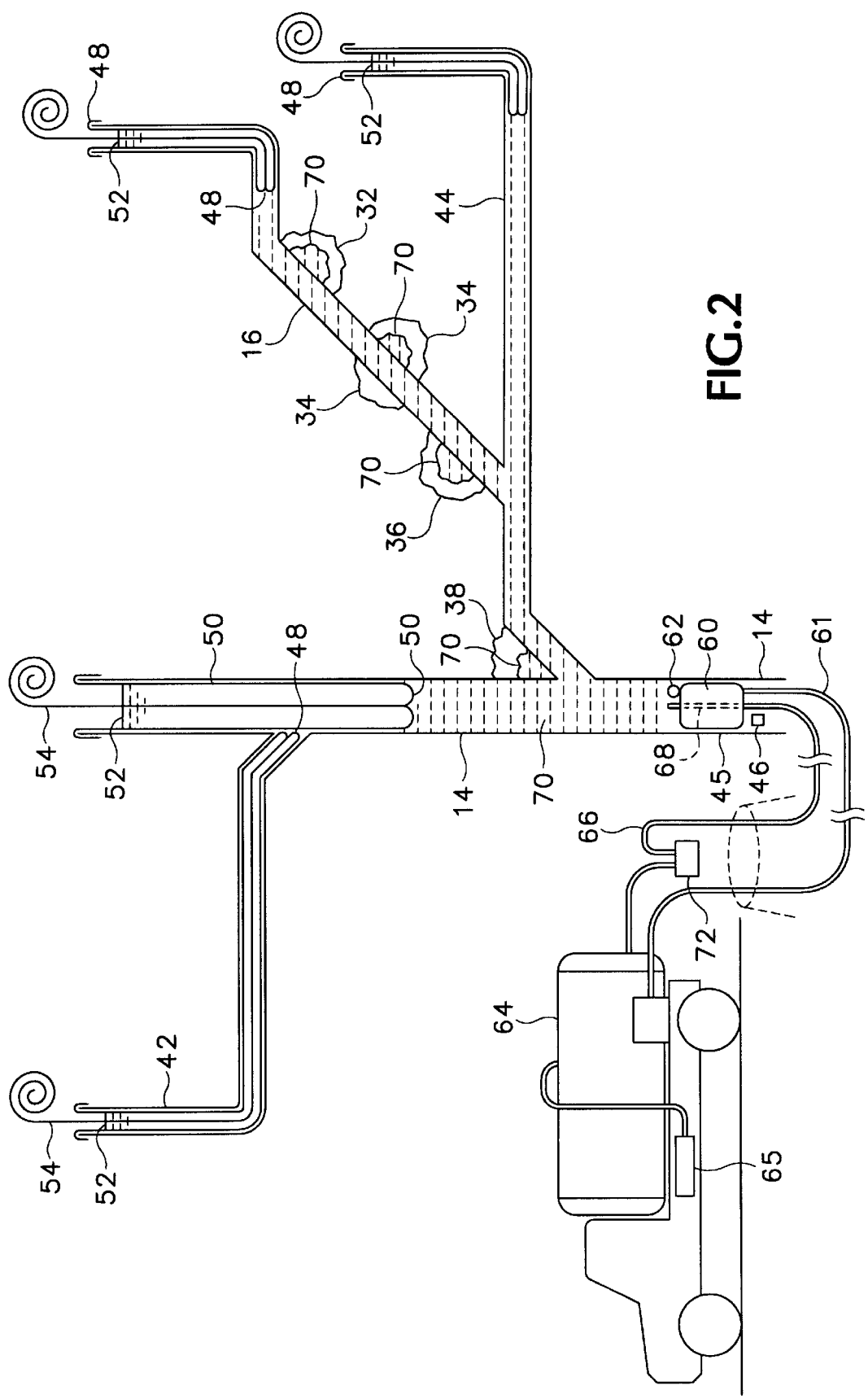
FIG. 2 is a diagrammatic view of a portion of a municipal sewer system including a main line and laterals including clean outs, and also showing apparatus in place for performing repairs in accordance with the present invention.

Referring now also to FIG. 2, in order to repair defects such as those just described with respect to the sewer pipes shown in FIG. 1, a portion of the sewer system which it is desired to repair is removed from use and isolated from flow of waste water and sewage. This may be accomplished by blocking flow upstream of the portion or segment of piping to be repaired, and conducting the material from upstream, sewage which would ordinarily be introduced from each individual service connection into a particular lateral sewer line 16, 42, or 44, around the segment to be repaired. This material can be reintroduced into the sewer piping beyond the downstream end 45 of the section of the sewer system to be repaired, as by reinserting it into the sewer main line at a downstream sewer manhole outlet. Preferably, at this time a flow meter 46 is installed into the sewer main pipe 14 at the downstream end 45 of the section of the sewer system which is to be repaired and the quantity of infiltration occurring prior to repair is measured and recorded.

The length of each portion of a lateral sewer pipe 16, 42, or 44 or the section of the main sewer line 14 which is to be sealed is measured, preferably by the use of a small closed circuit television camera attached to the end of a flexible push rod or other means.

A liner, or liner and containment tube 48 is then prepared in an appropriate length to be used within each lateral sewer pipe and a liner or containment tube 50 is prepared for the relevant section of the main sewer line 14. The material for such a tube 48 or 50 must have a diameter at least as large as that of the largest portion of the interior of the sewer pipe concerned.

The liner and containment tubes 48 and 50 must be of a flexible, thin material capable of withstanding the pressure required to evert the tube and install it within the length of lateral sewer pipe and which is capable of withstanding an elevated temperature, as will be explained subsequently. For example, such a tube may be of a strong, tough, elastic synthetic polyamide material such as Nylon, or of polyurethane, polyethylene, PVC, or silicone, reinforced or unreinforced, having a wall thickness in the range of 1 mil to 1/8 inch.

A quantity of mineral oil or another environmentally safe releasing agent is placed inside a length of thin-walled plastic liner tube material to form a liner and containment tube 48 or 50. With the releasing agent inside it the liner and containment tube 48 or 50 is rolled or folded in such a way as to thoroughly coat the interior of the tube with the mineral oil or other releasing agent.

Figure 3:
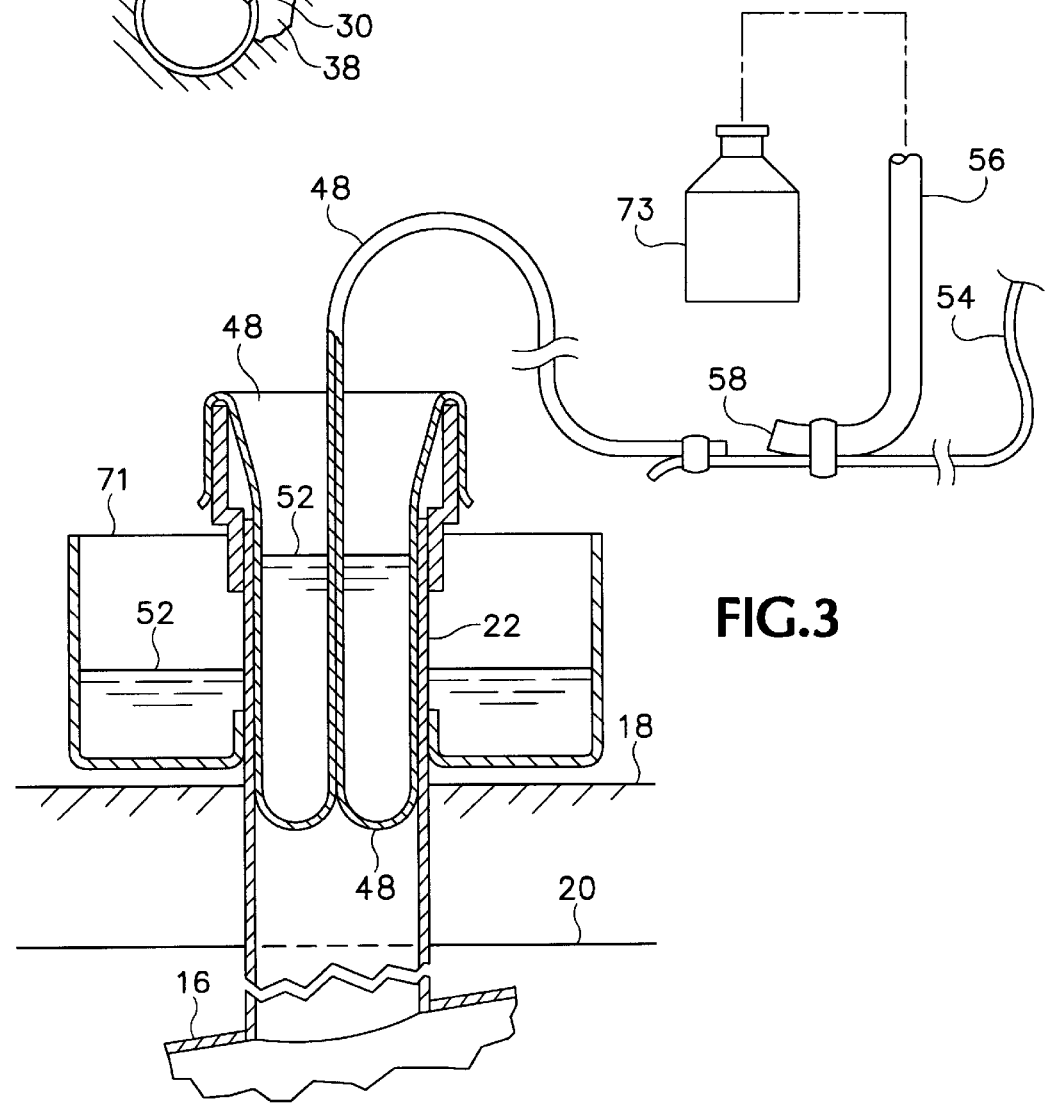
FIG. 3 is an elevational section view of an arrangement for inverting a liner tube into a clean out access portion of a sewer lateral in accordance with the present invention.

As shown in FIG. 3, such a tube 48 is then installed into each of the sewer lateral pipes through the respective clean out riser and into the sewer main pipe and through an upstream sewer manhole. A fluid 52, preferably water, is placed within each liner or containment tube under sufficient pressure to force each tube 48 to evert itself and extend downward inside the respective sewer lateral pipe 16, 42, 44, etc., or downstream in the main line pipe 14. While a liquid such as water is preferred, another fluid such as air or another gas might also be used, and it will therefore be understood that in connection with filling each of these liner or containment tubes the use of the word "fluid" as used herein should be understood to mean either a liquid or an appropriate gas.

Figure 4:
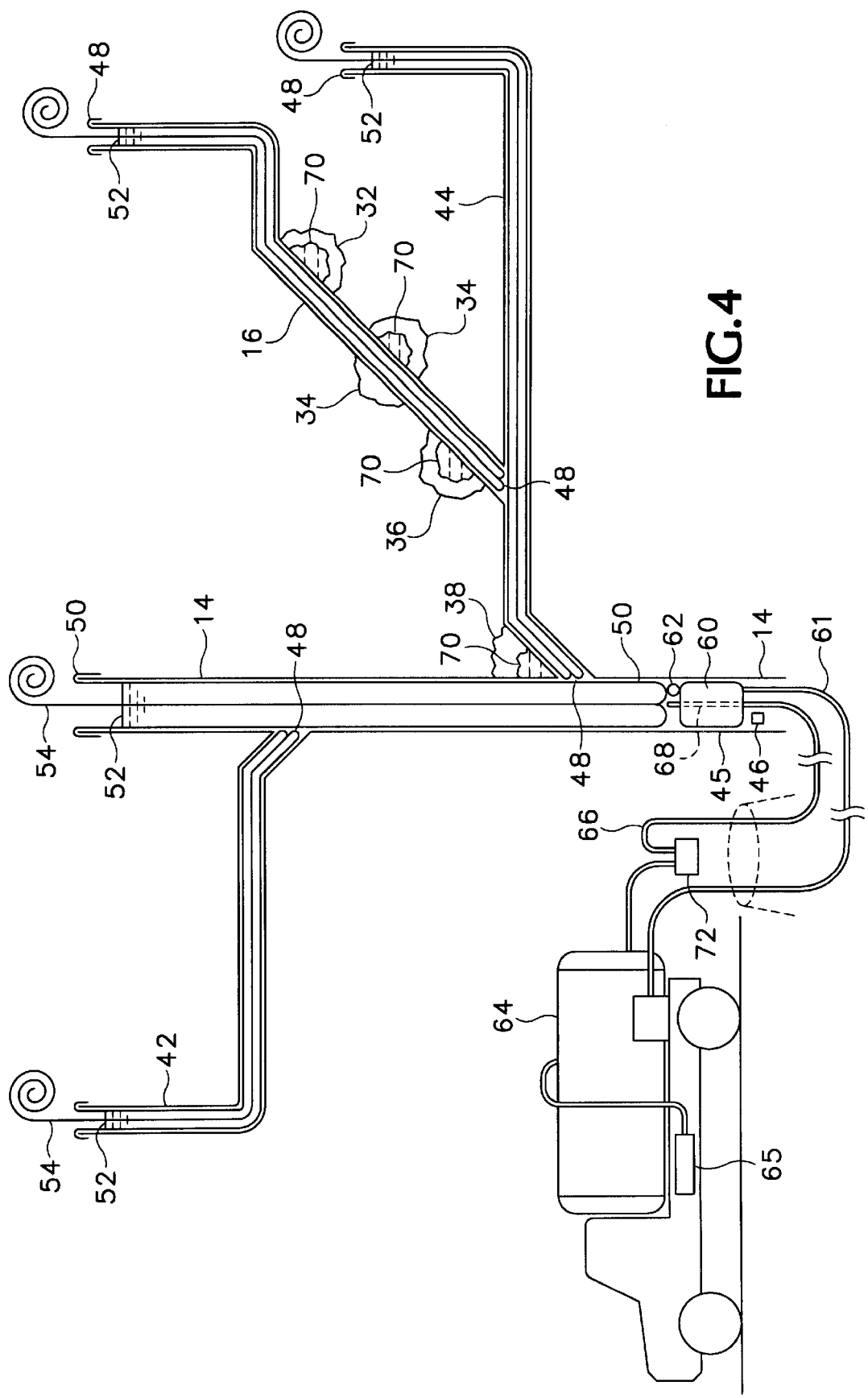
FIG. 4 is a view similar to FIG. 2 at a different stage of performing a repair of sewer pipes in accordance with the present invention.

Each of the liner and containment tubes 48, 50 is everted into the respective sewer pipe, with those in each of the laterals 16, 42, and 44 first being everted and extending to a position adjoining the main sewer line 14, as shown in the lateral pipe 42 in FIG. 2, after which the liner and containment tube 50 is everted in the main sewer line 14 past the lateral sewer pipe 42, etc., as shown in FIG. 2, until it extends finally to a position shown in FIG. 4, at the downstream end 45 of the section of main line pipe 14 being repaired. The fluid 52 within each of these liner and containment tubes 48 and 50 is contained and subjected to sufficient pressure to force the flexible thin material of each of the tubes into intimate contact against an interior surface of the respective sewer pipe, with a pressure exceeding the pressure exerted by ground water surrounding the sewer pipe and attempting to infiltrate through defects into the interior of the sewer pipe system to be repaired.

Preferably, the liner and containment tubes are sequentially everted and pressurized in a sequence intended to allow any ground water remaining within the sewer pipes 16, 42, 44 and 14 to drain toward the downstream end of the section of the sewer main line pipe 14 as the liner tube 50 is pressurized. Once all of the liner tubes 48 and 50 are pressurized migration of ground water within the portion of the sewer system being repaired is substantially stopped.

Before everting the liner and containment tubes, a retrieving line 54 is attached to the end of each. The retrieving lines 54 extend upward through the interior of the liner and containment tube 48 or 50 in each respective section of sewer pipe. A hose 56 of smaller diameter than that of the respective liner and containment tube is attached to the retrieving line, which carries an open end 58 of the hose into the respective section of sewer pipe. As will be explained more fully subsequently, the hose 56 may be used to carry a quantity of heated water, steam, or chilled water into the fluid within the respective liner tube at an appropriate time depending upon what type of sealant is to be used in connection with the repair being performed.

Once the liner and containment tubes 48 and 50 have all been inserted and placed under pressure as required within the several pipes of the portion of a sewer system which is being repaired, an inflatable plug 60 of the appropriate size is installed into the downstream end 45 of the section of main sewer line pipe 14, adjacent to or a desired distance away from the downstream end of the liner or containment tube 50, as shown in FIGS. 5 and 6. The plug 60 is then filled through a suitable pressure hose 61 and subjected to an appropriate pressure to retain it.

Attached to the plug 60 is a pressure sensing device 62 (shown only schematically) located on the upstream end, within the portion of the pipe system being repaired, and connected through a flow-through conduit 68 in the plug 60 for continuously measuring the pressure in the space between the plug and the downstream end of the everted liner and containment tube 50. A suitable remotely readable output transducer or connection 63 is associated with the sensing device 62 and provides a readout of the pressure where it is available to an operator. The pressure sensor 62 may, for example, include a balloon located adjacent the end of the plug 60 where fluid sealant material is to be placed, with the interior of the balloon connected through a suitable conduit to communicate an indication of the internal pressure where needed. For example, a transducer 63 may be used to send an electrical signal through wire (not shown) to indicate the pressure, or the conduit may be simply extended above the surface of the ground to show directly the water column height corresponding to the pressure at the sensor 62.

The plug 60 preferably also has an associated temperature sensor 67 and a suitable device to send a signal representative of the temperature within the portion of the sewer main pipe adjacent the plug 60. For example, an electrical thermocouple may be utilized to provide a useful electrical indication of the temperature through an electrical conductor pair 69 or other types of sensors and transducers may also be utilized.

A quantity of a fluid sealant material 70, which may be a liquid which will solidify at an appropriate temperature, or which may be a slurry or a liquid material which will harden after a particular amount of time as a result of chemical action, is contained in a tank 64, which may be conveniently installed on a portable chassis such as that of a truck. Preferably, the tank 64 is thermally insulated and includes heat exchanger tubes (not shown) capable of heating the contained sealant material and maintaining its temperature within a required range. A pressure control system 65 shown schematically is connected to the tank 64. A hose 66 or other conduit, which may include a heated jacket, connects the tank 64 to the through-conduit 68 of the plug 60 to permit the sealant material 70 to be forced, preferably primarily by gravity, into the space within the pipe 14 between the plug 60 and the downstream end of the liner and containment tube 50. Enough pressure is maintained on the sealant material, preferably monitored by using the sensing device 62, to counteract against and overbalance the pressure of any groundwater attempting to infiltrate through the pipe wall into the void between the plug and the downstream end of the liner and containment tube.

A quantity of the fluid sealant 70 is introduced into the portion of the sewer system to be repaired at a pressure also about equal to or slightly greater than the pressure within each of the liner and containment tubes 48 and 50, and as the fluid sealant 70 is introduced into the interior of the sewer pipes 14, 44, 42, and 16 the everteh liner tubes 48 and 50 are retracted and the pressure of the fluid 52 within each of the liner and containment tubes 48 and 50 is controlled carefully to maintain sufficient pressure to preclude infiltration of ground water into the sewer pipes. The pressure on the fluid sealant 70 within the tank 64 is also adjusted by the pressure control system 65, preferably in response to monitoring the pressure at the plug 64, to ensure that the pressure applied to the fluid sealant 70 is kept high enough within the section of sewer pipe system being repaired to exclude ground water and also to force a quantity of the fluid sealant material 70 outwardly through each of the defects 24, 26, 28, 30 and the like in the sewer pipes, in quantities effective to seal the defects or openings through the wall of the sewer.

The mineral oil or other releasing agent that was installed in the liner and containment tubes 48 and 50 coats the interior of each sewer pipe 16, 42, 44 and 14 to prevent the sealant material 70 from adhering to interior surfaces of the sewer pipe where it is not desired, and to permit the liner and containment tubes 48 and 50 to be retracted without adhering to the interior surfaces of the sewer pipes and without the sealant material 70 adhering to the surfaces of the liner and containment tubes 48 and 50 as they are retracted and replaced within the sewer pipes, as will be explained subsequently in greater detail.

A sufficient quantity of the fluid sealant 70 is installed through the hose 66 and the plug 60 into the sewer pipes to completely fill the section of the sewer system being repaired according to the method of the invention. As this is being done, each of the flexible thin plastic liner and containment tubes 48 in each of the lateral sewer pipes is retracted in response to the pressure of the fluid sealant material 70 to permit the fluid sealant material 70 to flow to a position which is optimally higher than the water table level 20. A sufficient length of the plastic liner and containment tube 48 or 50 is left in each pipe 16, 42, 44 or 14, subjected to enough pressure so that the remaining length of each liner and containment tube 48 or 50 acts as a plug in the respective lateral sewer pipe 16, 42 or 48 and at the upstream end of the section of the sewer main pipe 14 being repaired, to contain the fluid sealant material 70. Retraction of the liner and containment tubes may cause fluid 52 to overflow into a catch basin 71 shown in FIG. 3.

The fluid sealant material 70 is supplied and kept under pressure within the section of the sewer pipe system being repaired for a long enough period for effective quantities of the fluid sealant 70 to exude from the interior of the sewer pipe into the adjacent soil, and particularly into any voids 32, 34, 36, 38, etc., on the outside of the sewer pipes in the vicinity of each leaking defect, as shown in FIG. 2. The fluid sealant material 70 can thus fill at least portions of any such voids adjacent to leaking openings in the sewer pipes. It is intended that enough of the sealant material 70 should flow to the outside of the sewer pipes 14, 16, 42 and 44 and harden in place on the outside of the sewer pipe to act, together with sealant material 70 located actually within cracks 24 or other openings 26, 28, etc., in the walls of the sewer pipes, as a barrier against future infiltration of ground water at each defect being repaired according to the present method.

After the fluid sealant 70 under pressure has filled the interior of the section of the sewer system being repaired for a sufficient time for effective quantities of the fluid sealant material 70 to flow into voids 32, 34, 36, 38, etc., on the outside of the pipe being repaired, the pressure is increased as required in each of the plastic liner and containment tubes 48 and 50 and may be accordingly reduced slightly in the interior of the tank 64. This allows the thin plastic liner and container tubes 48 and 50 again to be everted into the several sewer lateral pipes 16, 42 and 48 and then into the sewer main pipe 14, and forces the remaining or excess quantities of fluid sealant material 70 out of the sewer pipes and back through the hose 66 toward the tank 64 to be recaptured.

In the case of chemically activated fluid sealant in the form of grout which would harden after a certain amount of time, a sump 72, which may be a separate compartment carried on the truck with the tank 4, may be connected with the hose or pipe line 66 between the tank 64 and the interior of the sewer pipe to recapture such fluid sealant material rather than permit it to be returned into the tank 64 where it could ruin the tank 64 by solidifying. In the case of certain fluid sealant materials which eventually will harden in place surrounding and in the openings 24, 26, 28, 30 and the like in the sewer pipes, a chemical inhibitor can be mixed with the excess material removed from the sewer pipes to prevent it from hardening and allow it to be used in some cases in a subsequent sewer repair.

Once all of the liner and containment tubes 48 and 50 have again been everted into the sewer pipes 16, 42, 44 and 14 and are once again in place as shown in FIG. 4, occupying substantially all of the portion of the sewer system where the fluid sealant has been introduced, the liner and containment tubes are maintained in a pressurized condition long enough for the fluid sealant material 70 to gel or harden in place where it fills and covers the previously leaking openings and at least partially fills the surrounding voids 32, 34, 36, 38, and the like.

As a further and important aspect of the method which has been described, depending upon the nature of the particular fluid sealant 70 used, the everted liner and containment tubes 48 or 50 can also be used to prepare the portion of the sewer system which is to be repaired to receive the fluid sealant and make its use more effective. For example, if a thermoplastic resin is being used as the fluid sealant it will have been heated to a fluid, molten state by a heat exchanger in the tank 64 and will be provided to the interior of the sewer system through the hose 66 and the flow-through plug 60 in a liquid state. In order to prevent such fluid sealant 70 from being cooled too much and rapidly solidifying before being able to exude into and partially fill the voids adjacent to the openings that need to be repaired, the sewer pipes, and to some extent the surrounding soil can be heated. This is accomplished by introduction and circulation of heated fluid within each of the liner and containment tubes 48 and 50, using the hoses 56 attached to the retrieving lines 54 to carry steam or hot water, or other appropriate heated fluid, as from a boiler 71 (FIG. 3) into the fluid 52 in the liner and containment tubes 48 and 50 within the main line sewer pipe 14 and each of the laterals 16, 42, 44, etc., being repaired according to the invention.

Later, once the molten sealant material 70 has been introduced and has had sufficient time to be forced out through the openings 24, 26, 28, 30 and the like into the surrounding voids 32, 34, 36, 38, etc., the liner and containment tubes 48 and 50 are again everted into the sewer pipe, preferably using fluid 52 such as water which is of an appropriate temperature not to cause the fluid sealant 70 to solidify immediately on the liner tube as it is being reintroduced and everted. Once the liner and containment tubes 48, 50 have been re-everted and have forced any excess fluid sealant material 70 back through the flow-through plug 60 and the hose 66 into the tank 64 or sump 72, the fluid in the liner and containment tubes can be replaced by chilled water to cool down the sewer system pipes and with them the sealant 70, solidifying the sealant in the openings in the pipe walls and in the voids in the vicinity of the openings.

Alternatively, in the case of liquid sealant materials which solidify as the result of a chemical reaction triggered by or occurring at or above a certain temperature, the sewer system will not be preheated, but may instead be chilled. Thereafter, once the fluid sealant 70 has been installed in defects and adjacent voids, and excess quantities of the sealant have been removed from the section of the sewer system being repaired, the liner and containment tubes 48 and 50 may be used to heat and thus activate the chemical sealant by introduction of warm water or steam into the liner and containment tubes within the main line sewer pipe and the laterals.

When fluid sealant materials 70 which are not particularly sensitive to temperature but require a certain amount of time to gel or solidify are used, the liner and containment tubes 48 and 50 are kept in place with the fluid 52 under sufficient pressure to support the sealant material and to continue to exclude groundwater while the sealant material solidifies or gels.

Once the fluid sealant material 70 has had the required time or has been heated or cooled as required, so that the sealant material has gelled or solidified as required, the liner and containment tubes 48 and 50 are emptied and removed and the inflatable flow-through plug 60 is removed, leaving the section of sewer pipe in an improved condition and substantially free from contaminating residue. Prior to removal of the downstream flow-through plug 60 the amount of infiltration may again be measured, to determine whether the repair process has been as effective as is desired.

In a repair procedure which is a somewhat different embodiment of the present invention, as shown in FIGS. 7–12, a procedure similar to that described previously is carried out in a somewhat modified fashion without the use of a flow-through plug, by inserting respective liner and I containment tubes 80 and 82 into a portion 83 of a sewer main line pipe both from its upstream end 84 and from its downstream end 86. Suitably large pressure containment support hoses 92 and 94, of the sort known for use in installing permanent resin-impregnated felt pipe liners, for example, may be used to support the liner and containment tubes 80 and 82 in the manholes 88 and 90. As in the previously-described version of the method according to the invention, a fluid 96, corresponding to the fluid 52, is used within the liner and containment tubes 80 and 82. The liner and containment tubes 80 and 82 thus isolate, for. example, the entire portion 83 of a sewer main line pipe extending between a pair of apart-spaced manholes 88 and 90 or other points of access.

Referring to FIGS. 8 and 9, one of the liner and containment tubes, for example, the liner and containment tube 82, is extended through the entire segment 83 of the sewer pipe system, to its far end. A quantity of an appropriate fluid sealant material 98 is introduced into the portion 83 of the sewer system to be repaired, through a hose 99 connected to a nozzle device 101, shown in FIG. 13–17, via a connector portion 103. The nozzle device 101 extends a short distance, such as two or three feet, into the interior of the sewer pipe portion 83.

The nozzle device 101 is preferably in the form of a rigid hollow tubular core 105 with a thin crescent cross-sectional shape, and covered with a layer 107 of a soft conforming material flexible enough to form a tight seal against the interior of the sewer pipe or like conduit by pressure in the liner and containment tube 80. The layer 107 may, for example, be of a suitable soft rubber or a closed-cell foam of an elastomeric material. The core 105 may be of suitably strong plastic resin, or of aluminum sheet, for example, and is tapered to join the connector portion 103, allowing the hose 99 to be connected securely.

Figure 7:
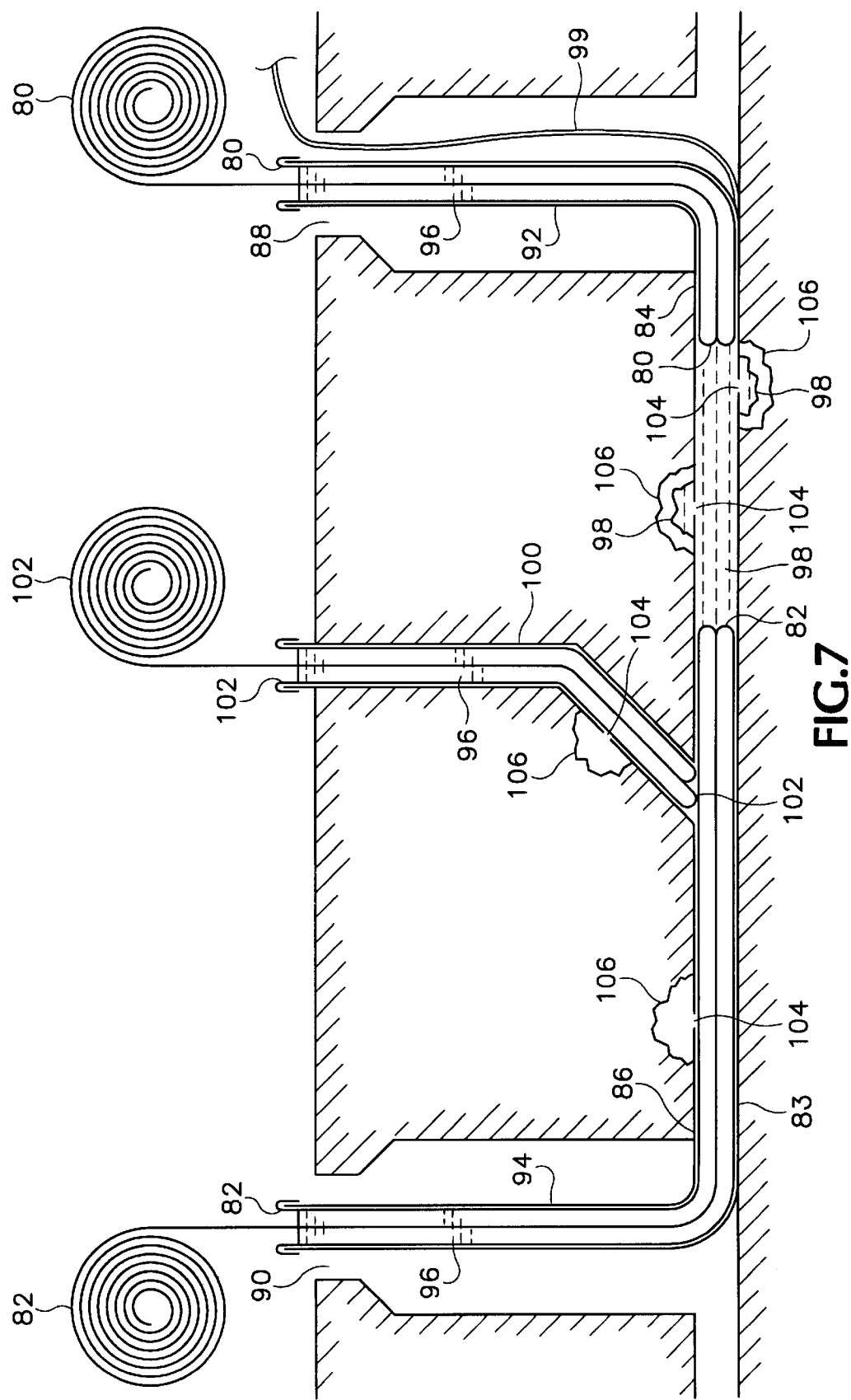
FIG. 7 is a simplified elevational section view of a length of sewer main between a pair of apart-spaced manholes and including a junction of a lateral sewer pipe with the main line sewer pipe at an early stage of performing a repair procedure in accordance with an alternative embodiment of the present invention.

When a quantity of fluid sealant 98 has been delivered through the hose 99 and the nozzle device 101 the fluid sealant 98 is followed by the liner and containment tube 80 as it is everted further into the sewer pipe, so that the quantity of sealant material 98 is contained between the advanced ends of the two liner and containment tubes 80 and 82 as shown in FIGS. 8 and 9. Pressure is maintained on the fluid 96 within each of the liner and containment tubes 80 and 82 to keep each of them tightly pressed against the interior surface of the respective portion of the sewer pipe system, to exclude groundwater, and to keep each of the liner and containment tubes in contact with a surface of the quantity of sealant material 98. A liner and containment tube 102 is everted similarly into a lateral sewer pipe 100 and extended until it meets the main sewer line pipe and the liner and containment tube 82 as shown in FIG. 7.

The sealant material 98 is thus also subjected to sufficient pressure to exclude groundwater surrounding the portion of the sewer pipe in which it is located and to urge the fluid sealant material 98 outward through any defects 104 in that portion 83 of the sewer pipe system to fill the defects 104 and to impregnate surrounding soil and fill voids 106 adjacent to the defects 104.

Figure 10:
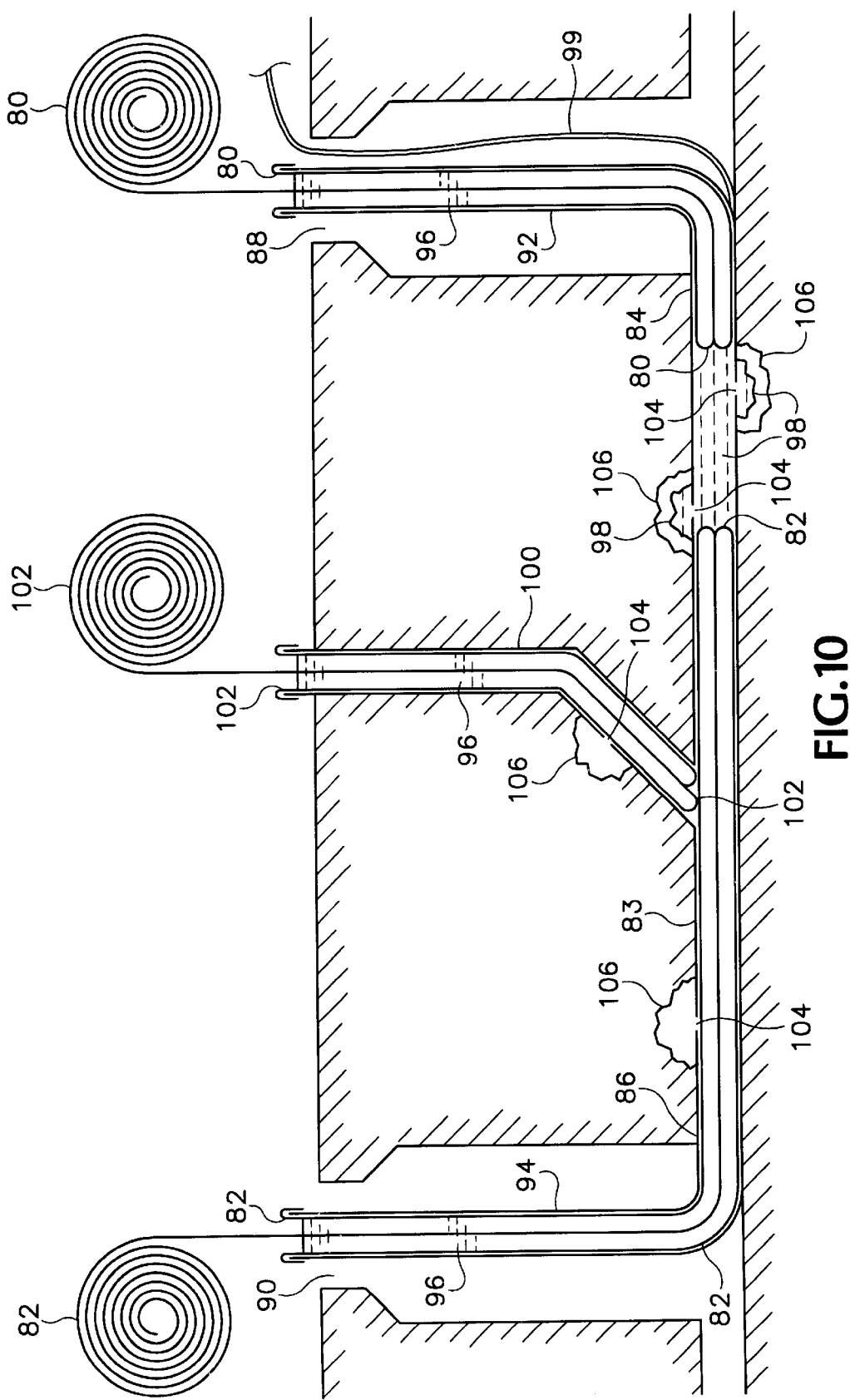
FIG. 10 is a view similar to FIG. 7 at a subsequent step of performing repairs of the sewer pipes in accordance with the invention.

As shown in FIG. 10, the pressures within the several liner and containment tubes 80, 82 and 102 are adjusted, retrieving lines (similar to the retrieving line 54 shown in FIG. 3) are used, and fluid 96 is introduced into or removed from the liner and containment tubes 80 and 82, varying the pressures in them in a coordinated fashion, to move the quantity of fluid sealant material 98 from a first end (the upstream end 84 as shown) toward the other end, along the sewer main pipe portion 83 in a controlled manner while always maintaining ample pressure on the sealant material 98. The pressures can be monitored in the liner and containment tubes 80 and 82 by observing the height of the fluid 96 in the upper end of each liner and containment tube 80 and 82.

The sealant material 98 can thus be utilized to fill and seal the defects 104 in the sewer pipe walls and flow into voids 106 in adjacent soil along the entire segment 83 of the sewer pipe system which is to be repaired in one operation, yet without requiring enough fluid sealant material 98 to fill that entire portion of the sewer system at one time. For example, a quantity of 50 gallons could be used as a first amount of fluid sealant material 98. As the liner and containment tube 82 is retracted and the tube 80 is everted further some of the fluid sealant material 98 exudes into the voids 106, and less of it remains between the liner and containment tubes 80 and 82 as shown in FIG. 12, while some has proceeded through the defects in the sewer pipe wall to partially fill voids 106. If the initial amount of fluid sealant material is all spent through defects 104 before the downstream end is reached, the tubes 82 and 80 are extended and retracted in coordinated fashion to the vicinity of the first end (such as upstream end 84), to allow another quantity of fluid sealant material 98 to be delivered between the liner and containment tubes 80 and 82, through the aforementioned nozzle device 101 shown in FIGS. 13–17. The tubes 80 and 82, with the contained fluid 96 still kept in each under slightly varying controlled pressure, are again moved slowly in coordination to deliver the next amount of fluid sealant material 98 to additional defects 104 located between the upstream and downstream ends 84 and 86 of the segment 83 with the procedure repeated until fluid sealant material 98 has been delivered preferably to all defects 104 and voids 106 along the main sewer pipe.

Depending on the size and number of lateral sewer pipes such as the lateral pipe 100, when a quantity of fluid sealant material is delivered from the vicinity of the outlet of the hose 99 to the end of the lateral pipe 100 by coordinated movement of the liner and containment tubes 80 and 82, into positions on each side of the junction of the lateral pipe 100 with the main line portion 83, the liner and containment tube 102 is retracted, as shown in FIG. 12, to allow the fluid sealant material 98 to be forced into the lateral pipe 100, to fill defects 104 and voids 106 in and surrounding the lateral pipe 100. After the sealant material 98 has had ample time to fill defects 104 in the lateral pipe 100 and move into voids 106 surrounding the lateral pipe 100, the liner and containment tube 102 can be re-everted to the junction with the main line sewer pipe and be kept under pressure as the sealant material cures. If the number of lateral sewer pipes is too large fluid sealant material 98 can be introduced directly into one or more of them using a nozzle device 101.

Figure 11:
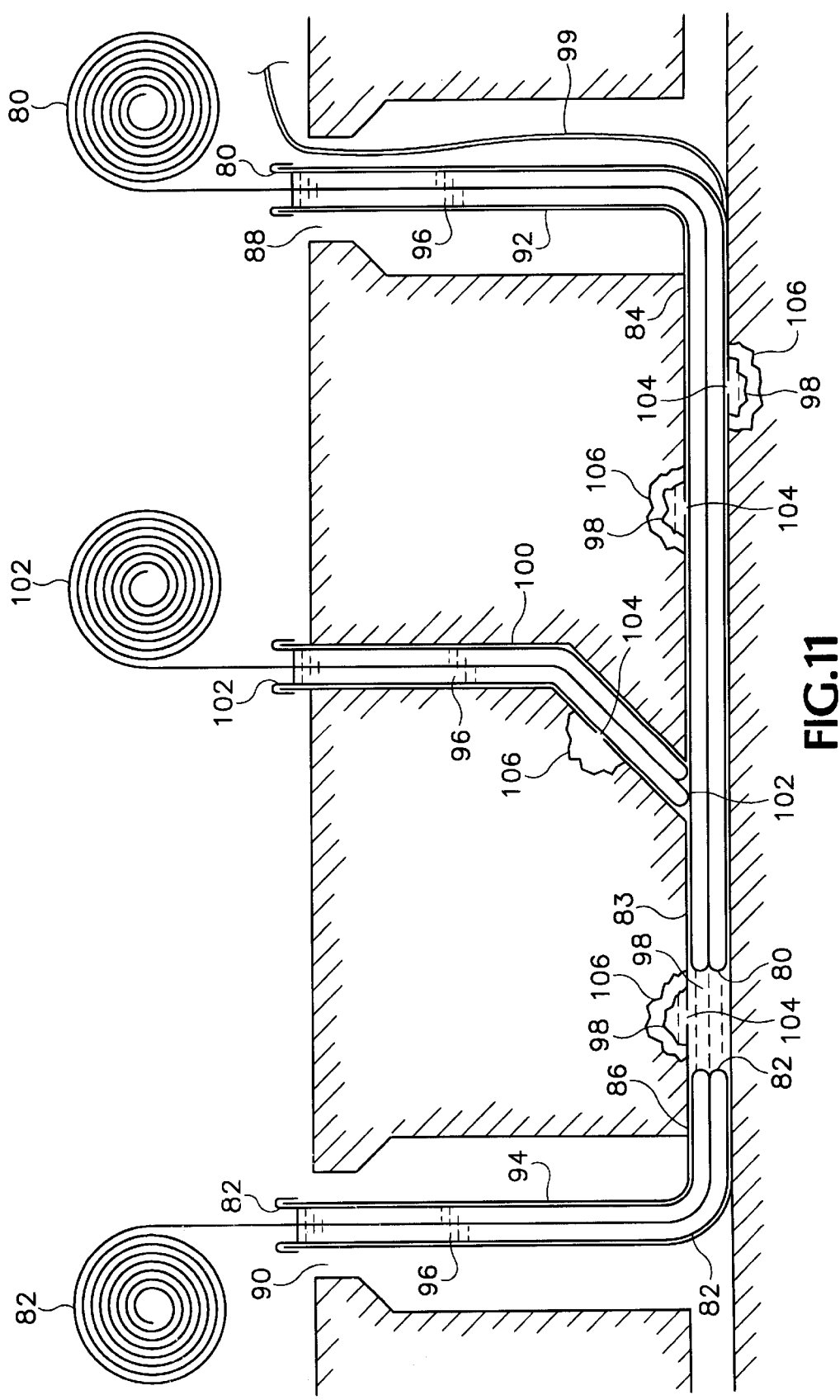
FIG. 11 is another view similar to FIG. 7 at a further subsequent step of performing repairs of the sewer pipes in accordance with the invention.

If, after all of the defects 104 have been filled and sufficient sealant material has been forced out into the surrounding voids 106 and soil, there still remains an unused quantity of the fluid sealant material 98, as shown in FIG. 11, the liner and containment tube 80 and 82 can be extended and retracted in coordination to move the excess quantities of the fluid sealant material 98 to the location of the nozzle 101 to be removed through the nozzle device 101. Thereafter, as described with respect to FIGS. 1–4, the liner and containment tubes 80, 82 and 102 are kept pressurized long enough in the entire portion 83 of the sewer system for the fluid sealant material 98 to gel or solidify.

Similarly, as described in connection with the method of the invention shown in FIGS. 1–6, hoses (not shown) may be used to heat or chill the fluid 96 in each of the liner and containment tubes 80, 82 and 102 to prepare the sewer pipes to be repaired to keep the fluid sealant material 98 liquid and later to initiate its solidification. If there are several lateral sewer pipes 100 or many defects 104 it may be necessary to utilize a separate hose 99 to deliver fluid sealant material 98 in one or more of the lateral pipes 100 directly.

The fluid sealant material 98 or 70 can be any easily handled material deliverable at a temperature readily reached and maintained long enough to achieve installation and curing of the material. Additionally, it is desirable for the sealant to be able to flow into defects in the pipe walls and to displace groundwater, so its density should preferably be similar to or slightly greater than that of water.

Some of the materials already known for effecting in place repairs of such pipes using other methods of installation may also be used, such as a tar or an asphaltic material that can be installed at a suitably elevated temperature and allowed to solidify by cooling.

For another example, one useful material is an acrylimide polymer that is prepared for use by mixing with water and oxidizers and then gels in a predictable time. Such a material is available from Avanti International of Houston, Tex. as its AV100 pipe repair grout.

Another satisfactory material is a polyurethane-based material available from Minnesota Mining and Manufacturing (3-M) as 3-M 5600 soil sealant and stabilizer. This material can be cured as a gel or a foam, depending on the repairs to be done.

Wax, preferably mixed with hydrophillic additives to promote swelling to provide tight sealing, may be used as well, installed at an elevated temperature in a molten state and cooled to solidify it in place. It is also desirable to enhance the density of wax to enable it to displace groundwater. Both can be accomplished by mixing quantities of Bentonite clay with wax in appropriate proportion to achieve a density of the mixture at least about equal to and preferably slightly greater than that of water.

As a further variation of the method embodying the invention, as shown in FIG. 18, a quantity of fluid sealant material 98 can be used in a manner similar to that described above in connection with FIGS. 7–12, to plug defects 104 in a portion 83 of a sewer pipe system into which a resin-impregnated permanent liner 110 is being installed. Pressure is maintained by the opposing liner and containment tube 82, and the permanent liner 110 is slowly enough everted into the sewer pipe to give the fluid sealant material ample time to flow into defects 104 to effect a sealing closure that is supported and made permanent by the installation of the permanent liner 110, which adheres to the interior of the pipe and cures in place. Such a permanent liner 110 may be of known construction of felt and a fluid-impervious layer of a suitable plastic film, and thus as it is being slowly everted into the sewer pipe it contains fluid 96 under adequate pressure to exclude groundwater until the resin with which it is impregnated, and the fluid sealant material 98 plugging defects 104 have cured adequately. The fluid sealant material 98 thus cured in such defects 104, outside the installed and cured permanent liner 110 helps prevent groundwater from infiltrating into the sewer pipe and migrating along the liner 110.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of repairing leaking underground sewer pipes, comprising the steps of:
   (a) isolating a defective segment of a pipe having a wall including defects to be repaired;
   (b) everting a liner tube of flexible watertight material within said defective segment of a pipe, thereby placing said watertight material in contact with an interior surface of said segment of pipe to be repaired, by filling said liner tube with a fluid and placing said fluid under pressure sufficient to hold said watertight material tightly against said interior surface along at least a first portion of said defective segment of pipe to be repaired, to seal said defects in said wall of said first portion, thereby substantially preventing ingress of ground water into said first portion of said segment;
   (c) introducing a quantity of a fluid sealant into a second portion of said defective segment of said pipe adjacent said liner tube, and placing said sealant under pressure, thereby forcing an effective quantity of said sealant into said defects in said wall of said second portion of said defective segment of said pipe;
   (d) thereafter, withdrawing said liner tube from at least a first part of said first portion of said defective segment while keeping said sealant under said pressure and thereby simultaneously unsealing said defects in said wall of said first portion and forcing a quantity of said sealant into said first part of said first portion, and thereby forcing an effective quantity of said sealant into said defects in said wall located in said first part of said first portion of said detective segment;
   (e) thereafter, returning said liner tube into said first part of said first portion of said defective segment to seal said defects in said wall of said first portion while continuing to keep said fluid within said liner tube under said pressure for a predetermined period of time, thereby retaining said effective quantity of said sealant in said defects in said wall of said first part of said first portion of said defective segment of said pipe long enough for said sealant to cure sufficiently to plug said defects effectively and thereby to repair said defective segment of said pipe;
   (f) removing excess quantities of said fluid sealant from said second portion of said segment of said pipe before said excess quantities can cure, while continuing to keep said fluid within said liner tube under said pressure; and
   (g) subsequent to said predetermined period of time removing said liner tube and said fluid contained therein from said segment of said pipe.

2. The method of claim 1 wherein said liner tube, when filled with said fluid, acts as a temporary extensible and retractable plug in said first portion of said defective segment of a pipe.

3. The method of claim 1 including the step of everting a liner tube in a lateral sewer line.

4. The method of claim 1 wherein said sealant material has a specific gravity no less than about 1.0.

5. The method of claim 1 wherein said sealant is a wax.

6. The method of claim 1 wherein said sealant is a thermoplastic resin.

7. The method of claim 1 wherein said sealant is a thermosetting resin.

8. The method of claim 1, including providing the sealant to the segment of pipe to be repaired at a predetermined temperature.

9. The method of claim 1, including the step of supplying said sealant through a supply conduit including a heat exchanger, in order to keep the sealant within a predetermined range of temperatures.

10. The method of claim 1, including the step of containing a supply of said fluid sealant in a closed vessel at a controlled pressure and temperature while forcing said effective quantity of said sealant into said leaking defects of said wall of said pipe and thereby controlling said pressure applied to said fluid sealant relative to said pressure applied to said fluid in said liner tube, and keeping said pressures applied to said fluid in said liner tube and to said fluid sealant in said first portion of said defective segments great enough to exclude ground water from said segment of said pipe to be repaired.

11. The method of claim 1 wherein said step of introducing a quantity of a fluid sealant includes providing enough of said fluid sealant to substantially fill said defective segment of a pipe.

12. The method of claim 1, including applying pressure to said fluid sealant for a long enough time for said sealant to flow through said openings in said wall and to infiltrate soil surrounding said pipe in a quantity effective to establish a sealing barrier on an outside of said pipe adjacent said leaking defects.

13. The method of claim 1 wherein said step of isolating a defective segment of a pipe includes the step of placing an inflatable flow-through plug at a downstream end of said segment.

14. The method of claim 1 wherein said fluid sealant includes a hydrophillic material.

15. The method of claim 1, including the step of coating an interior surface of said defective segment of said pipe with a releasing agent by coating an interior surface of said liner tube with said releasing agent prior to said step of everting said liner tube.

16. The method of claim 1 wherein said sealant is a tar.

17. The method of claim 1 wherein said sealant is an asphaltic material.

18. The method of claim 1 wherein a permanent impregnated liner tube is everted into said defective segment of said pipe in contact with said quantity of said fluid sealant and a fluid under pressure is contained within said permanent liner tube and holds said permanent liner tube in contact with said interior of said wall of said defective segment retaining said fluid sealant in said defects while said fluid sealant and said permanent liner both cure in place.

19. The method of claim 1 wherein said fluid in the liner tube is air.

20. The method of claim 1, including the step of everting a second liner tube into said defective segment, filling said second liner tube with said fluid and placing said fluid in said second liner tube under pressure and wherein said step of introducing a quantity of a fluid sealant includes placing the fluid sealant between said liner tube and said second liner tube, and said method also including the step of controlling said pressures on said fluid in each of said liner tubes so as to move the quantity of sealant material along said defective segment of pipe to be repaired by advancing one of said liner tubes while retracting the other.

21. The method of claim 20, including the further step of subsequently controlling said pressures on said fluid in each of said liner tube and said second liner tube so as to move a portion of said quantity of sealant to a predetermined location, and there placing an additional quantity of said fluid sealant between said liner tube and said second liner tube.

22. The method of claim 1, including the steps of sensing and monitoring the pressure of said fluid sealant within said defective segment of pipe to be repaired.

23. The method of claim 22, including the step of controlling the pressure applied to said fluid sealant within said defective segment of pipe while forcing said effective quantity of said fluid sealant into said leaking defects.

24. The method of claim 1, including the step of everting said liner tube to completely fill a defective segment of pipe to be repaired.

25. The method of claim 24, including the step of using said liner tube for a predetermined time to exclude groundwater from said defective segment of pipe and to hold in place a quantity of sealant installed in said defective segment of pipe.

26. The method of claim 1 wherein said defective segment of pipe includes a junction of a lateral pipe into a main line pipe and said step of isolating a defective segment of a pipe includes the step of isolating a segment of said main line pipe including said junction.

27. The method of claim 26 wherein said step of introducing a quantity of a fluid sealant into a second portion of said defective segment of said pipe includes introducing said fluid sealant into said segment of said main line pipe including said junction after performing said step of isolating a segment of said main line.

28. The method of claim 1 wherein said fluid in the liner tube is water.

29. The method of claim 28, including the step of heating said water that is located in said liner tube and thereby preheating said defective segment of pipe to be repaired prior to introducing said quantity of fluid sealant.

30. The method of claim 28, including the step of cooling said water in said liner tube after returning said liner tube into said first part of said first portion of said defective segment, and thereby causing said sealant to solidify.

31. The method of claim 28, including the step of heating said water in said liner tube after returning said liner tube into said first part of said first portion of said defective segment in order to cause said sealant to cure.

32. A method of repairing leaking underground sewer pipes, comprising the steps of:
  (a) blocking an end of a defective segment of a pipe having a wall including defects to be repaired;
  (b) everting a liner tube of flexible watertight material within said defective segment of a pipe, thereby placing said watertight material in contact with an interior surface of said segment of pipe to be repaired, by filling said liner tube with a fluid and placing said fluid under pressure sufficient to hold said watertight material tightly against said interior surface along at least a first portion of said defective segment of pipe to be repaired, to seal said defects in said wall of said first portion, thereby substantially preventing ingress of ground water into said first portion of said segment;
  (c) introducing a quantity of a fluid sealant into a second portion of said defective segment of said pipe adjacent said liner tube, and placing said sealant under pressure, thereby forcing an effective quantity of said sealant into said defects in said wall of said second portion of said detective segment of said pipe;
  (d) displacing an advanced end of said liner tube longitudinally along said defective segment and away from said second portion by forcing a quantity of said sealant into a first part of said first portion and thereby unsealing said defects in said wall of said first portion and forcing an effective quantity of said sealant into at least some of said defects in said wall located in said first part of said first portion of said defective segment;
  (e) thereafter, returning said liner tube into said first part of said first portion of said defective segment to seal said defects in said wall of said first portion while continuing to keep said fluid within said liner tube under said pressure for a predetermined period of time, thereby retaining said effective quantity of said sealant in said defects in said wall of said defective segment of said pipe long enough for said sealant to cure sufficiently to plug said defects effectively and thereby to repair said defective segment of said pipe;
  (f) removing excess quantities of said fluid sealant from said second portion of said segment of said pipe before said excess quantities can cure, while continuing to keep said fluid within said liner tube under said pressure; and
  (g) subsequent to said predetermined period of time removing said liner tube and said fluid contained therein from said segment of said pipe.

33. The method of claim 32, including the step of heating said fluid that is located in said liner tube and thereby preheating said defective segment of pipe to be repaired prior to introducing said quantity of fluid sealant.

34. The method of claim 32 wherein said defective segment of a pipe is a lateral pipe extending into a main line pipe at a junction, and wherein said step of blocking an end of said defective segment includes the step of isolating a segment of said main line pipe including said junction.

35. The method of claim 34 wherein said step of introducing a quantity of a fluid sealant into a second portion of said defective portion of said defective segment of said pipe includes introducing said fluid sealant into said segment of said main line pipe including said junction, after performing said step of isolating a segment of said main line pipe.

36. The method of claim 32, including the step of everting a second liner tube into said defective segment, by filling said second liner tube with said fluid and placing said fluid in said second liner tube under pressure, and wherein said step of introducing a quantity of a fluid sealant includes placing the fluid sealant between respective advanced ends of said liner tube and said second liner tube, and said method also including the step of controlling said pressures on said fluid in each of said liner tube and said second liner tube so as to move the quantity of sealant material along said defective segment of pipe to be repaired by advancing one of said liner tubes while retracting the other.

37. The method of claim 36, including the further step of subsequently controlling said pressures on said fluid in each of said liner tube and said second liner tube so as to move a portion of said quantity of sealant to a predetermined location, and there placing an additional quantity of said fluid sealant between said advanced ends of said liner tube and said second liner tube.

38. A method of repairing leaking underground sewer pipes, comprising the steps of:

(a) isolating a defective segment of a pipe having a wall including a plurality of defects to be repaired;

(b) everting a liner tube of flexible watertight material within said defective segment of a pipe, thereby placing said watertight material in contact with an interior surface of said defective segment, by filling said liner tube with a fluid and placing said fluid under pressure sufficient to hold said watertight material tightly against said interior surface along at least a first portion of said defective segment of pipe to be repaired, to seal said defects in said wall of said first portion, thereby substantially preventing ingress of ground water into said first portion of said defective segment;

(c) filling a second portion of said defective segment of said pipe adjacent an advanced end of said liner tube with a quantity of a fluid sealant, and placing said sealant under pressure, thereby forcing an effective quantity of said sealant into one of said plurality of defects located in said wall in said second portion of said defective segment of said pipe;

(d) thereafter, withdrawing said advanced end of said liner tube from at least a first part of said first portion of said defective segment while introducing more of said fluid sealant into said second portion and keeping said sealant under said pressure, thereby unsealing said defects in said wall of said first portion and forcing a quantity of said fluid sealant to fill said first part of said first portion, and simultaneously forcing an effective quantity of said sealant into one of said defects located in said wall in said first part of said first portion of said defective segment;

(e) thereafter, returning said advanced end of said liner tube into said first part of said first portion of said defective segment to seal said defects in said wall of said first portion while continuing to keep said fluid within said liner tube under said pressure for a predetermined period of time, thereby retaining said effective quantity of said sealant in said one of said defects in said wall in said first part of said first portion of said defective segment of said pipe long enough for said sealant to cure sufficiently to plug said one of said defects effectively and thereby to repair said defective segment of said pipe;

(f) removing excess quantities of said fluid sealant from said second portion of said segment of said pipe before said excess quantities can cure, while continuing to keep said fluid within said liner tube under said pressure; and (g) subsequent to said predetermined period of time removing said liner tube and said fluid contained therein from said segment of said pipe.

39. The method of claim 38, including the step of heating said fluid that is located in said liner tube and thereby preheating said defective segment of pipe to be repaired prior to introducing said quantity of fluid sealant.

40. The method of claim 38 wherein said defective segment of a pipe is a lateral pipe extending into a main line pipe at a junction, and wherein said step of isolating a defective segment includes the step of isolating a segment of said main line pipe including said junction.

41. The method of claim 40 wherein said step of introducing a quantity of a fluid sealant into a second portion of said defective portion of said defective segment of said pipe includes introducing said fluid sealant into said segment of said main line pipe including said junction, after performing said step of isolating a segment of said main line pipe.

42. The method of claim 38, including the step of everting a second liner tube into said defective segment, by filling said second liner tube with said fluid and placing said fluid in said second liner tube under pressure, and wherein said step of introducing a quantity of a fluid sealant includes placing the fluid sealant between respective advanced ends of said liner tube and said second liner tube, and said method also including the step of controlling said pressures on said fluid in each of said liner tubes so as to move the quantity of sealant material along said defective segment of pipe to be repaired by advancing one of said liner tubes while retracting the other.

43. The method of claim 42, including the further step of subsequently controlling said pressures on said fluid in each of said liner tubes so as to move a portion of said quantity of sealant to a predetermined location, and there placing an additional quantity of said fluid sealant between said advanced ends of said liner tube and said second liner tube.

* * * * *